INVENTOR
STANLEY H. MOLTER
ATTORNEY.

April 18, 1967     S. H. MOLTER     3,315,191
TIMER AND TIMER CONTROL CONTACTOR COMBINATION
Filed June 29, 1965     4 Sheets-Sheet 3

INVENTOR.
STANLEY H. MOLTER by John H. Leonard
ATTORNEY.

April 18, 1967     S. H. MOLTER     3,315,191
TIMER AND TIMER CONTROL CONTACTOR COMBINATION
Filed June 29, 1965     4 Sheets-Sheet 4

INVENTOR
STANLEY H. MOLTER
by: John H. Leonard,
ATTORNEY.

United States Patent Office 3,315,191
Patented Apr. 18, 1967

3,315,191
TIMER AND TIMER CONTROL CONTACTOR COMBINATION
Stanley H. Molter, Menomonee Falls, Wis., assignor to Square D Company, Park Ridge, Ill., a corporation of Michigan
Filed June 29, 1965, Ser. No. 467,923
4 Claims. (Cl. 335—67)

This invention relates to a timer and particularly to a timer for use in connection with contactors, relays, systems interlock switches and the like, and is an improvement in the timer disclosed in the copending application of Gottsacker and Nielson, Ser. No. 281,277, filed May 17, 1963, now U.S. Patent No. 3,254,177, issued May 31, 1966, and entitled, Timer and Timer Contactor Combination. For the purposes of illustration herein, the timer is described as applied to an electromagnetic control relay and switch, as more fully disclosed in said copending application, its use for other purposes being readily apparent from the illustrative example.

As more fully described in the above-entitled application, the timer includes a slide movable along a lineal path and connected to a rock lever which translates the lineal movement of the slide to vertical movement of the carrier of a relay, and vice versa. The slide, in turn, is connected to the stem of the timer for moving the stem in one direction against the resistance of a return spring embodied in the timer. The stem is also moved against the spring returned push button of a snap-acting switch. In this prior arrangement, the carrier of the relay is operated electromagnetically, thereby rocking the lever for translating the motion of the movable contact carrier of the relay to motion of the slide along the path of the slide. This movement is effected by the electromagnetic means of the relay which is thereby forced to move the slide not only against the resistance of the push button return spring, but also against the return spring of the timer itself. This imposes a substantial load.

The slide in the prior structure also is opposed in its movement by three slide return springs. These slide return springs are provided in order to return the slide from its operated position to its starting position. Thus, for time delay upon energization, satisfactory results could be obtained because it was necessary only that the slide overcome the three additional springs. However, for a time delay upon de-energization, the slide had to overcome not only its own return springs but also the switch and timer return springs. Accordingly, in order not to overburden the electromagnetic means of the relay, some of the slide return springs had to be removed upon changing the timer from time delay upon energization to time delay upon de-energization. In accordance with the present invention, the timer and the operating slide have been modified so that this change of springs is no longer necessary to change the timer from time delay upon energization to time delay upon de-energization.

In the structure of the above-entitled copending application, the slide employed was relatively heavy, being comprised of three parts of heavy metal. In accordance with the present invention, the three parts of heavy metal have been replaced by a single light one-piece casting of synthetic organic plastic which is extremely light in weight, thereby greatly reducing the inertial forces heretofore existing when the metal slide was used. Consequently, the danger of metal fatigue and breakage of parts is reduced.

The present timer, the same as the one in the above copending application, can be placed on the upper part of a contactor housing in one position wherein it is operative for providing a time delay function after energization and, when rotated 180° about an upright axis from the one position and replaced on the upper end of the housing in the new rotated position, becomes operative for providing a time delay function after de-energization, all without the necessity of changing or removing any springs or parts of the existing structure.

Another specific object is to provide a timer which employs a housing wherein is provided a horizontally movable slide which is connected to and controlled by the timer and which, by an oscillatable crank, is connectable to a movable member, such as a movable contact carrier, the crank being so arranged that the movement of the slide is horizontal and the forces transmitted between the crank and movable member is in a path substantially at right angles to the path of the slide.

Other objects and advantages of the present invention will become apparent from the following description wherein reference is made to the drawings, in which.

Figure 7:
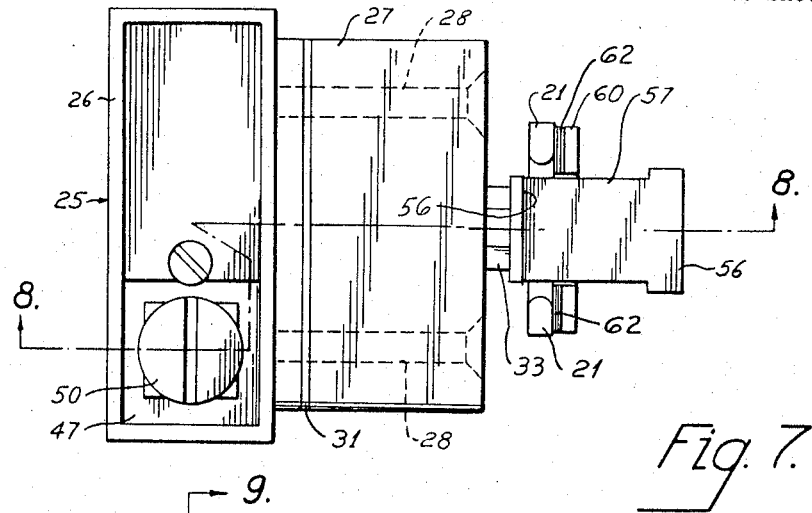
FIG. 7 is an enlarged top plan view of the timer assembly with the contactor energized.
Figure 8:
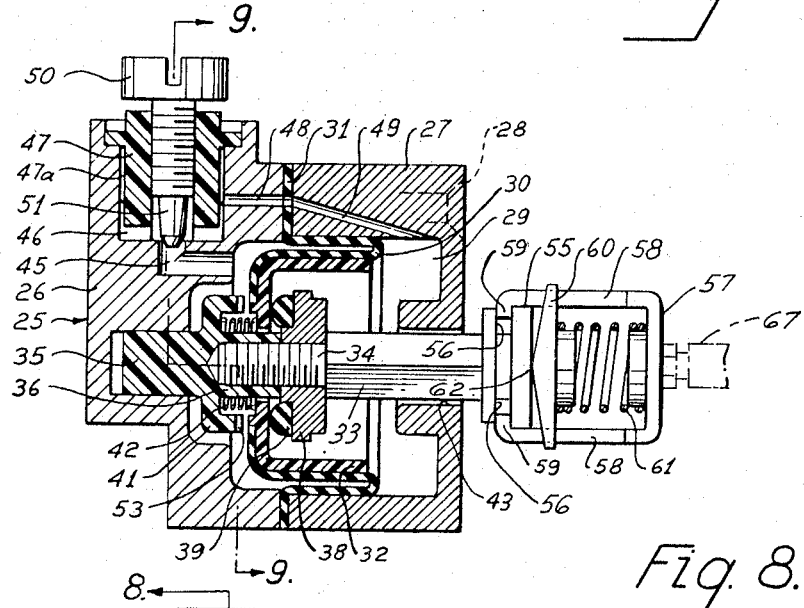
Figure 9:
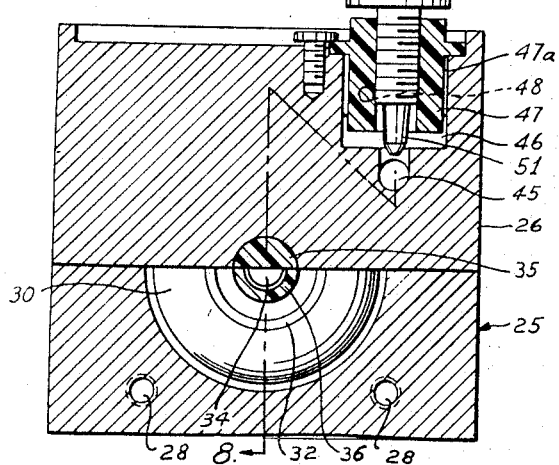

FIG. 8 is a vertical, longitudinal sectional view of the timer taken on the lines 8—8 and 9—9 in FIGS. 7 and 9, respectively, part thereof being shown in section for clearness in illustration;

FIG. 9 is a vertical cross sectional view taken on the line 9—9 of FIG. 8; and

Figure 2:
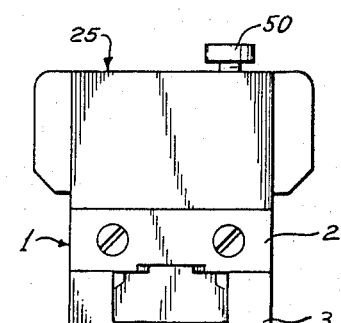
FIG. 2 is a front elevation, partly in section, of the timer assembly and contactor illustrated in FIG. 1.
Figure 2:
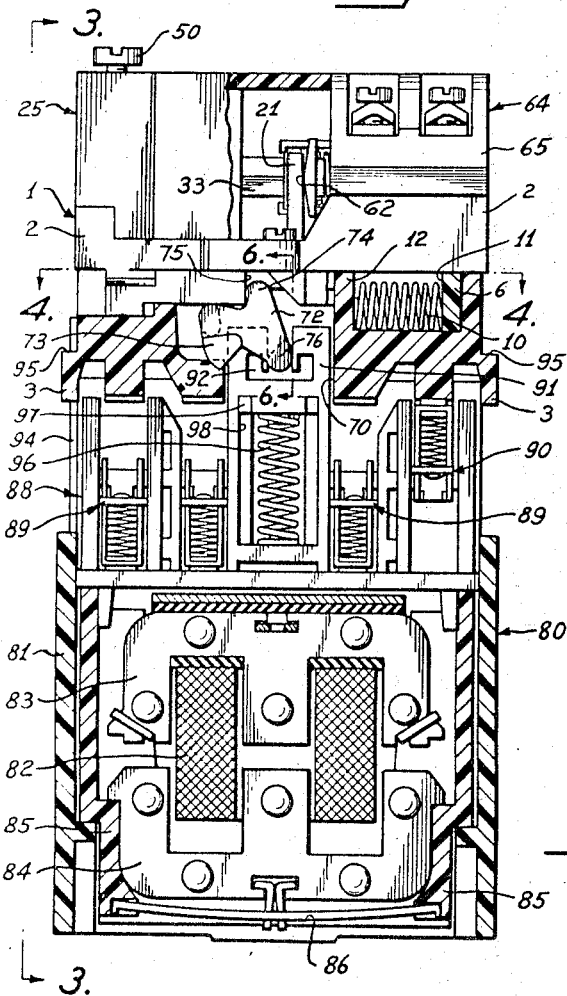
Figure 10:
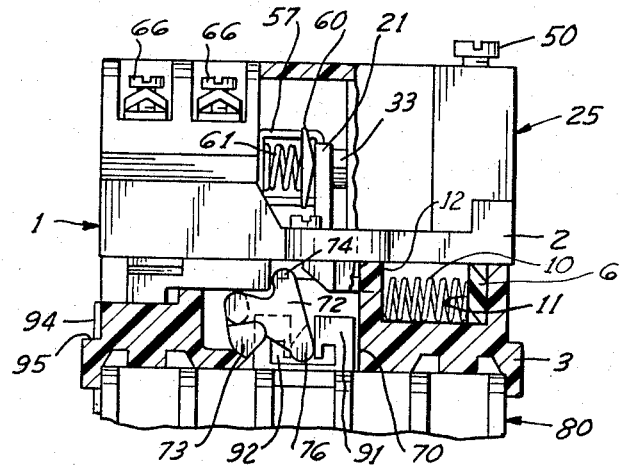

FIG. 10 is a view similar to FIG. 2 with the timer assembly rotated 180° from its position in FIG. 2, and with one of the two main return springs omitted, for changing the timing operation.

For convenience in disclosing the difference between the present structure and that of the above copending application, the structure is described herein in considerable detail, using the same reference numerals and description as were used in the above copending application.

Referring to the drawing, the timer assembly comprises a housing 1 having a top portion 2 and a bottom portion 3, both of insulating material, detachably fastened together by screws. The housing portion 3 is provided with horizontal guideways 4 and 5 at opposite ends, respectively. Supported on the guideways is a slide 6. Instead of having a separately formed extension which operates in the guideway 5 and which is connected to the slide by a screw, the slide is made in one piece of molded synthetic organic plastic material of light weight. Thus the inertial forces of the slide 6 when its movement along a horizontal linear path in the housing is interrupted, are greatly reduced and correspondingly the dangers of failure of parts due to metal fatigue.

Figure 4:
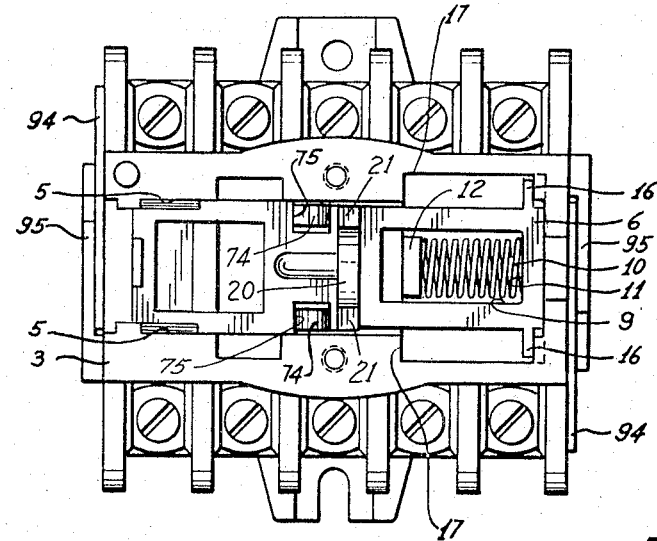
FIG. 4 is a top plan view similar to FIG. 1, but with the timer assembly removed to expose the slide or slider of the timer assembly and means which interconnect the timer, slide, and movable contact carrier of the contactor, as viewed on the line 4—4 in FIG. 2.
Figure 5:
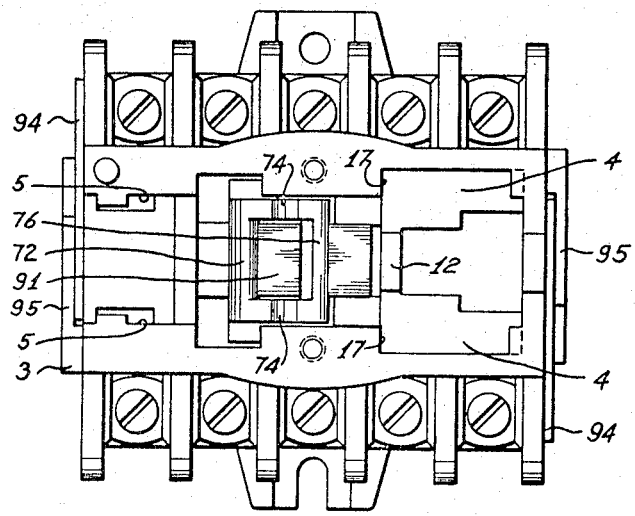
FIG. 5 is a view similar to FIG. 4 with the slide removed to show the rock lever for connecting the slide and the movable contact carrier of the contactor.
Figure 6:
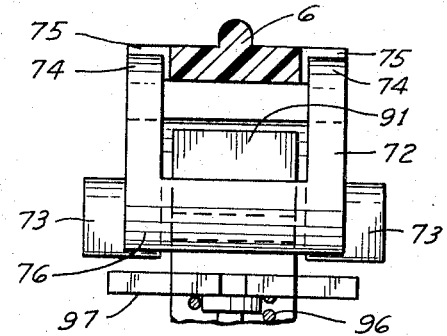
FIG. 6 is a vertical sectional view taken on the line 6—6 in FIG. 2.

The slide has an opening 9 near one end in which is received a return spring 10, the spring being in abutment at one end with a shoulder 11 on the slide and at the other end with an abutment 12, in and rigid with, the housing 1. This spring urges the slide to a retracted position, as illustrated in FIG. 4.

The additional springs provided in the structure of the copending application, originally located alongside the spring 10 are omitted as they are not necessary in the present structure. The slide 6 is provided with laterally extending ears 16 which assist in guiding the slide. The slide is provided with an upstanding yoke portion 20 having two spaced yoke arms 21 for cooperation with a timer 25.

The timer 25 is made as a separate unit which can readily be attached to or detached from the top portion 2 of the housing 1. As best illustrated in FIG. 8, the timer comprises a two part body composed of portions 26 and 27 secured together by suitable screws 28 and provide a cavity 29. Mounted in the cavity is a diaphragm 30 having a peripheral flange 31 which is gripped firmly between the adjacent end faces of the body portions 26 and 27 in sealing relation. Within the diaphragm is a piston 32 in the form of an open end cup with an axial aperture or passage in its bottom wall. An operating stem 33 of hexagonal cross section is slidably mounted for endwise movement in a bore in the body portion 27 in coaxial relation with the piston 32. The stem has a reduced threaded inner end portion 34 which extends through the piston and central portion of the diaphragm and receives at its other end a valve retainer 35. The retainer 35 is threadably secured to the reduced portion 34 by means of the sleeve portion 36 which extends through the center of the diaphragm 30 and piston 32 with slight radial clearance so that air can pass between the outer periphery of the sleeve portion 36 and the central passage of the diaphragm and sleeve piston.

Mounted in fixed axial position on the stem 33 is a poppet valve 38 having a resilient annular seat 39 which engages the inner face of the bottom wall of the piston 32 in sealing engagement about its central aperture. In the structure of the above-identified copending application, a return spring was interposed between the end of the body portion 27 and the poppet valve 38 and normally urged the piston to the left in FIG. 8. In accordance with the present invention, no such return spring is necessary. Instead, the spring restored push button of the switch, later to be described returns the slide to its starting position when the electromagnetic means is de-energized.

The retainer 35 has a peripheral flange 41 adjacent to the diaphragm and which terminates in slightly spaced relation therefrom so that the diaphragm can move toward and away from the flange a slight distance. A seating spring 42 is interposed between the retainer 35 and the piston and normally urges the piston 32 against the seat 39 of the valve 38.

The body portion 27 has a hexagonal passage 43 the wall of which fits the stem 33 with slight radial clearance so as to permit the escape of air through the clearance space therebetween, but constrains the stem 33 from rotation about its axis.

The body portion 26 has a duct 45 which connects the cavity at the side of the diaphragm opposite the valve 38 with a bore or cavity 46. Mounted in the cavity 46 is a suitable insert 47 which is internally threaded to receive an adjusting screw. The insert is provided with ribs 47a so that air entering the cavity 46 can pass along the outside of the insert. Leading from the cavity 46 is a duct 48 which connects with a duct 49 in the body portion 27, a suitable port being provided in the diaphragm flange 31 at the juncture of the ducts 48 and 49 for placing them in communication with each other. The duct 49 connects with the portion of the cavity in the body portion 27 at the valve side of the diaphragm.

It is apparent that with this arrangement, due to the spring 42, the piston is yieldably held in sealing engagement with the seat 39 of the valve 38. Consequently, as the stem 33 is moved to the left in FIG. 8, air cannot escape between the outer periphery of the sleeve portion 36 and the periphery of the central aperture through the piston 32 and diaphragm 30 as access thereto would be prevented by the seat 39 engaging the piston bottom wall. Consequently, the valve piston moves to the left, air in the cavity in the body portion 26, to the side of the piston and diaphragm opposite the valve 38, is forced outwardly through the duct 45 into the cavity 46 and out of the cavity 46 through the ducts 48 and 49 into the cavity in the body portion 27 at the valve side of the diaphragm wherein it can escape between the valve stem 33 and the walls of the passage 43.

Mounted in the insert 47 is an adjusting screw 50 which is in threaded engagement therewith and has a tapered end 51 which enters the outlet of the bore 45 so as to adjust the rate at which the air can escape, depending on the axial position of the screw 50, and thus provide a time delay.

On the other hand, though a time delay may be desired in this direction of movement, the rapid movement of the stem 33 in the opposite direction is desirable. A sudden movement of the stem 33 to the right in FIG. 8 temporarily unseats valve 38 from the bottom wall of the piston 32, the spring 42 being compressed until the diaphragm is free from the valve 38 and against the peripheral edge of the flange 41 of the retainer 35. Passages 53, provided by scallops in the end margin of the flange 41, permit air to escape past the retainer and hence escape between the now unseated valve 38, and through the central aperture in the diaphragm and piston. The rate at which this air escapes in this manner is independent of the setting of the regulating screw 50.

In order to operate the timer by the slide, the stem 33 is provided with an enlarged head 55 and shoulders 56 spaced endwise of the stem 33 therefrom. A yoke 57 having arms 58 with inturned marginal flanges 59 is arranged so that the flanges engage between the head 55 and shoulders 56. A member 60 is yieldably pressed against this head by one end of a spring 61 of which the other end engages the opposite end of the yoke 57. The spring 61 thus urges the flanges 59 yieldably against the underface of the head 55 and urges the member 60 in a direction such that its peak 62 is caused to engage firmly against the opposite face of the head.

Figure 1:
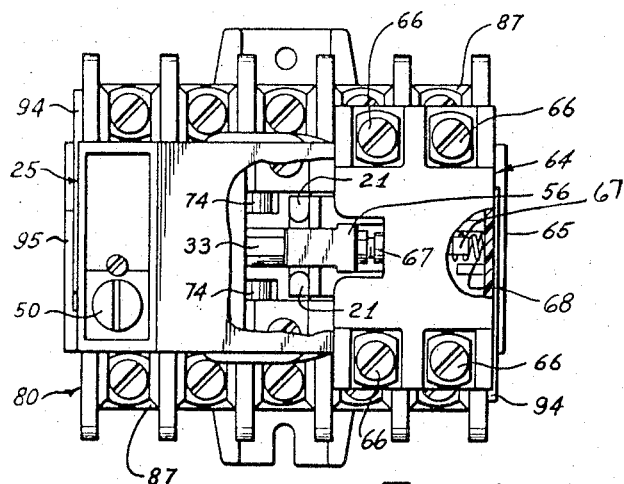
FIG. 1 is a top plan view of the timer assembly and contactor embodying the principles of the present invention, part of the cover of the timer assembly being broken away for clearness in illustration.
Figure 3:
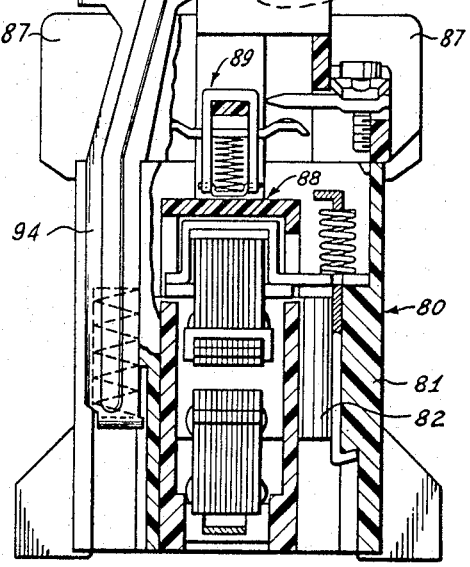
FIG. 3 is a left end elevation, partly in section, of the structure illustrated in FIGS. 1 and 2, viewed on the line 3—3 in FIG. 2.

The timer assembly also includes interlock switch 64. As illustrated in FIGS. 1 through 3, the interlock switch 64 comprises a housing 65 on the housing top portion 2 in fixed position relative to the timer 25. The switch has externally accessible connectors 66, one pair of which is operative when the switch is moved in one direction to one position and the other pair of which is operative when the switch is moved in the opposite direction to another position. The specific details of the switch are unimportant except that the switch is a self-restoring dead center type snap switch. The switch has an operating push button 67 which, when moved a predetermined distance axially in one direction, snaps the switch into closed relation with one of the pair of contactors of the connectors 66. When the push button 67 is released, it and the switch are restored with snap action into closed position with the contactors of the other pair of connectors 66 by a return spring 68. The specific details of the switch are secondary to the fact that it is so arranged that its stem 67 is engaged by the yoke 57 when the stem 33 moves to the right in FIG. 8, and is released when the stem 33 is moved to the left to retracted position, and has its own return spring.

The end of the yoke 57 outwardly from the body portion 27 engages the push button 67 and operates the switch, and due to the spring 61, a lost motion is provided for any over movement so as not to damage the switch.

In the structure of the above identified application, no shoulders such as the shoulders 56 were provided, and hence the yoke 57 could move relative to the stem 33 endwise of the stem before the return spring 40 was fully restored to its normal condition and the time delay terminated. The return action of the slide was extremely rapid, and hence required both expansion and compression of the spring 40 during timing and reset of the timer. As a result, when the yoke 57 moved very rapidly toward the diaphragm cavity during reset, the spring 61 would be compressed differently for each cycle. This, in turn, induced an inwardly directed movement of the stem 33 that varied with each cycle, thereby rendering the timing inaccurate.

Due to the omission of a return spring in the timer itself and the provision of the shoulders 56, the return spring of the switch 64 is used to return the stem 33. Hence the timer stem 33 and push button 67 of the switch 64 operate in fixed relation to each other.

As hereinbefore mentioned, it is desirable that the timer be adapted for ready connection to a piece of equipment to be timed. For this purpose, as illustrated in FIG. 2, the body portion 3 has an opening 70 therein. A crank or rock lever 72 is mounted in the body portion 3 for rocking about an axis 73 and is exposed by the opening. The lever 72 has two fingers 74 which are engaged by a suitable shoulder 75 on the slide so that, as the slide is moved to retracted position by its spring 10, it rocks the lever 72 clockwise in FIG. 2, about the rocking axis of the rock lever. The lever is provided with a second finger 76 which is so positioned relative to the rocking axis 73 and the fingers 74 that as the fingers 74 are moved generally horizontally by the slide 6 as the slide moves toward retracted position, the finger 76 is moved downwardly substantially vertically an equal amount. The rock lever 72 is exposed by the opening 70 and provides an interconnecting means for transmitting operating forces between the timer slide and the controller which activates the timer.

In order to reduce the height and provide for a compact operation such as when the timer is used with electromagnetic relays and contactors having a vertically movable contact carrier, it is desirable that the horizontal movement be translated to vertical movement for operating a vertically movable contact carrier.

It is to be noted that the yoke arms 21 of the slide 6 are always disposed between the body 25 and the member 60 in all operating positions of the time.

As mentioned, it is desirable that the timer be used in connection with a controller such as the electromagnetic relay, as described in the above identified copending application. This relay, indicated generally at 80, comprises a molded hollow housing 81 in which is mounted an electromagnetic coil 82 and magnet or pole piece 83 which cooperate with an armature 84. The armature is mounted in a sliding guide 85 and held snugly in position therein by a spring 86. On the upper end of the body are mounted two stationary contact assemblies 87 which form a continuation of the body housing 81 and which are readily detachable therefrom, as described in the above copending application. Carried on the top of the guide 85 for movement therewith and with the armature is a movable contact carrier 88 in which are a plurality of normally open contacts 89 and a plurality of normally closed contacts 90. The arrangement of the contacts is relatively unimportant, insofar as concerns this invention, and they can be rearranged for different normally open or normally closed operations, as desired, depending upon the operations to be controlled.

The contact carrier 88 is provided with upstanding arm 91 which, at its upper end, is provided with a transverse inverted T-slot 92 of which the T-leg opens outwardly through the top of the arm 91. The slot 92 is positioned so that when the housing portion 3, with the housing portion 2 and timer assembly assembled thereon, is clamped on top of the top part of the relay housing defined by the stationary contact assemblies 87, the fingers 76 or the rocker 72 is disposed in the slot 92 and provides an operating connection between the rocker and carrier 88.

This connection is such that as the finger 76 moves downwardly, it moves the carrier in the downward direction. Referring to FIG. 2, it is apparent that with the parts arranged in the relative positions there illustrated, this downward movement is effected by the movement of the slide to the right to its retracted position by the return spring 10. This movement of the slide 6 causes its yoke arms 21 to pull the stem 33 to the right and thereby cause the stem 33 to push the yoke 57 against the push button 67 of the switch 65, thereby moving push button 67 to operate the switch out of its self-restored position.

During this operation, since air can escape around the valve 38 and between the diaphragm 30 and sleeve 36 to relieve any vacuum created in the cavity in the body portion 26, and can escape around the stem 33 through the passage 43, there is no time delay.

On the other hand, upon energization of the coil 82, the armature 84 is moved upwardly, thereby moving the carrier 88 upwardly. This forces the finger 76 upwardly, rocking the rocker 72 counterclockwise in FIG. 2, and thereby moving the slide 6 to the left against the resistance of its return spring 10. This movement of the slide releases its yoke arms 21 from the member 60 whereupon the spring 68 of the switch 65 forces the stem 33 to the left while the stem 33 and push button 68 remain in contact. However, this seats the valve 38 and air pressure is developed in the cavity in the body portion 26. This pressure can be relieved only by escape through the duct 45 of which the outlet port is controlled by the screw 50. Hence a time delay, the duration of which depends on the setting of the screw 50, resists movement of the stem 33 to the left. Since the stem 33, through the yoke 57 bears against the push button 68 at all times, this time delay is imposed on the switch 65, delaying the movement of the push button 67 to the left in FIG. 2 and thereby the self-restoration of the switch. Thus in FIG. 2, the time delay is one occurring after energization of the relay coil.

As described in the above copending application, the relay is provided with spring biased clamps 94 which are adapted to clamp a cover on the relay. In the present instance, instead of clamping the cover on the upper end of the relay, as defined by the contact assemblies 87, the housing portion 3 is provided with clamping shoulders 95 which are positioned so that when the clamps 94 are operated, they engage the shoulder 95 and pull the portion 3, thereby, the entire timer assembly is pulled downwardly so that the housing portion 3 is held firmly in position on the upper end of the relay housing as defined by the removable contact assemblies 87.

In some cases it is desirable to provide a time delay after deenergization of the coil 82. For this purpose, the parts are repositioned as illustrated in FIG. 10. In this respect, it is to be noted that the bottom face of the portion 2 and top face of the housing portion 3 are symmetrical about a vertical central axis. These faces are shaped so that they fit each other not only in the position illustrated in FIG. 2 but also when the housing portion 2 is rotated 180° about the upright axis. Hence, by removing the portion 2, rotating it 180° about the axis, and reconnecting it on top of the housing portion 3, a time delay after deenergization is obtainable. In either rotated position, the yoke arm 21 must be disposed between the peak 62 of the member 60 and the timer body portion 27 for proper operation.

Referring again to FIG. 10, the rocker still is moved so that the finger 76 is moved downwardly when the slide 6 is moved to retracted position to the right by its spring 10. This movement releases the yoke arms 21 from the member 60 so that the stem 33 is moved to the right by the spring 68 of the switch 65 against the air pressure in the cavity of the body portion 26, under the control of the screw 50. This imposes a time delay on the movement of the push button 67 in the self-restoring direction of the switch 65 after the coil 82 is deenergized. On the other hand, upon energization of the coil 82, the finger 76 is moved upwardly, forcing the slide to the left in FIG. 10, against the resistance of the spring 10. This pulls the stem 33 to the left, unseating the valve 38 and allowing immediate movement of the stem 33 and push button 68 to the left. Thus the push botton 68 is moved without time delay out of self-restoring position upon energization of the coil 82, the reverse of the operations in FIG. 2.

Generally it is desirable that the movable carrier be returned to lowered position more positively than by gravity when the coil 82 is deenergized. For this purpose a spring 96 is usually provided when a top cover is used as in the copending application. The spring 96 bears at its lower end on the carrier 88 and at its upper end on a holder 97 slidable vertically in a slot 98 in the arm 91. When the cover is fastened in place, it bears on the upper face of the holder 97 so that the spring 96 biases the carrier 88 downwardly.

However, when the timer assembly is substituted for the cover, the spring 96 may be removed as the return spring 10 of the slide 6 acts to return the movable carrier after deenergization of the coil 82. If the spring 96 were retained under such conditions it would merely impose an additional and unnecessary load on the armature.

Since no return spring is provided for the stem 33, the spring 10 can remain in place for time delay after deenergization, as illustrated in FIG. 10, as well as for time delay after energization.

In the position shown in FIG. 2, the armature, upon energization of the coil 82, must overcome only the spring 10 and the return spring 68 of the switch. There is no return spring of the timer stem 33 to be overcome, as the spring 10 alone is adequate to return the improved light weight slide 6. Upon return it has no spring to overcome.

In the position shown in FIG. 10, the armature, upon energization of the coil 82, would have to overcome only the spring 10 and on return only the switch return spring 68. Again there is no return spring for the stem 33 to be overcome. Hence the resistance to movement of the armature is well within acceptable limits without changing the number or value of any spring or springs.

For convenience in description, the contactor and timer have been described as being in an upright position when positioned as illustrated in FIG. 2, it being understood that the terms "upright," "vertical" and "horizontal" are merely relative, as the entire combination is operative regardless of its physical position.

Having thus described my invention, I claim:

1. A timer comprising a housing, a timing mechanism carried thereby and having an operating connecting element movable to and fro along a predetermined path, a slide mounted in the housing for sliding along a path extending generally endwise of said predetermined path, resilient lost motion means interconnecting the slide and element for movement of the element by the slide in at least one direction from a starting position of the element, a switch having an operating push button in operative engagement with the element and movable to one operating position when the element is moved in said one direction along its path by the slide, means in the housing drivingly connected to the slide and accessible from the exterior for connection to a moving part of extraneous equipment, characterized in that means connect said element and push button for movement together in fixed relation to each other in said opposite direction, and a return spring is incorporated in the switch and is operative to resiliently oppose movement of the element in said one direction and to return both said push button and element in said opposite direction.

2. A structure according to claim 1 wherein the return spring of the switch is the sole means for returning said element to its starting position.

3. A structure according to claim 2 wherein power means are provided for moving the slide out of a starting position, a slide return spring is connected to the slide and housing for returning the slide to its starting position when the power means is inactive, and said slide return spring has a greater rate than, and thereby is, sufficient to overcome, the switch return spring.

4. A structure according to claim 1 wherein the slide is a light weight integral structure of molded synthetic organic plastic.

References Cited by the Examiner

UNITED STATES PATENTS

| 2,748,219 | 5/1956 | Buchanan | 200—153 |
| 3,254,792 | 5/1966 | Gottsacker et al. | 200—97 |

FOREIGN PATENTS 992,792  10/1951  France.

BERNARD A. GILHEANY, *Primary Examiner.*

H. E. SPRINGBORN, *Assistant Examiner.*